United States Patent [19]

Furukawa et al.

[11] Patent Number: 4,840,858
[45] Date of Patent: Jun. 20, 1989

[54] SECONDARY CELL

[75] Inventors: Nobuhiro Furukawa; Koji Nishio; Noriyuki Yoshinaga, all of Hirakata, Japan

[73] Assignee: Sanyo Electric Co., Ltd., Moriguchi, Japan

[21] Appl. No.: 206,056

[22] Filed: Jun. 13, 1988

[30] Foreign Application Priority Data

Jun. 12, 1987 [JP] Japan ............................ 62-147496
Dec. 18, 1987 [JP] Japan ............................ 62-322266

[51] Int. Cl.⁴ ........................ H01M 4/60; H01M 6/16
[52] U.S. Cl. ............................................. 429/197; 429/213
[58] Field of Search ................ 429/213, 212, 197, 194

[56] References Cited

U.S. PATENT DOCUMENTS 4,321,114  3/1982  MacDiarmid et al. ............... 204/2.1
4,442,187  4/1984  MacDiarmid et al. ............... 429/213

FOREIGN PATENT DOCUMENTS 56-136469  10/1981  Japan .

Primary Examiner—Anthony Skapars
Attorney, Agent, or Firm—Armstrong, Nikaido, Marmelstein, Kubovcik & Murray

[57] ABSTRACT

A rechargeable secondary cell having the following as main components: a positive electrode formed of a conductive polymer, a negative electrode, a separator disposed between the positive and negative electrodes, an electrolyte comprising a mixed solvent of γ-butyrolactone and a cyclic carbonic ester compound or ethylene carbonate, each being expressed by the following chemical formula.

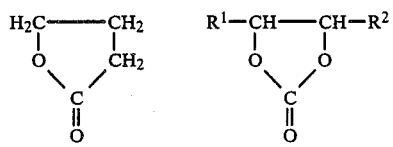

γ-butyrolactone    cyclic carbonic ester compound

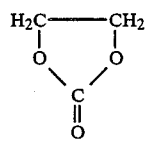

ethylene carbonate (where $R^1$ is a lower alkyl group having 1–3 carbon atoms and $R^2$ is a hydrogen atom or a methyl group, $R^2$ being a hydrogen atom, and $R^1$ being a group other than the methyl group.)

15 Claims, 6 Drawing Sheets

SECONDARY CELL

BACKGROUND OF THE INVENTION (1) Field of the Invention

The present invention relates to a secondary cell employing a conductive polymer as at least a positive electrode.

(2) Description of the Prior Art

In recent years, as disclosed in Japanese Patent Publication Kokai No. 56-136469, a secondary cell employing a conductive polymer as an electrode has been proposed.

A conductive polymer employed for this type of secondary cell, in general, has a poor conductivity. However, the polymer can be doped or undoped with various dopants, which improves the conductivity of the polymer remarkably. The polymer doped with an anion such as $ClO_4-$ and $BF_4-$ is employed as a positive electrode material and the polymer doped with a cation such as $Li+$ and $Na+$ as a negative electrode material, respectively. Then, a rechargeable cell is produced by effecting doping and undoping electrochemically and reversibly.

The conductive polymer is generally produced by means of chemical polymerization or electrolytic polymerization by an oxidizing agent and, polyacetylene, polypyrrole, polythiophene, polyaniline and polyparaphenylene have been known as representative examples. If the polymer is obtained in powdery form it is molded under pressure for use and if in film form, it is punched to the shape corresponding to an electrode or reduced to powder. A cell employing a conductive polymer thus obtained is light in weight and has a high energy density. Further, hopes are placed on this type of cell because of its characteristics of being pollution-free.

Particularly, polypyrrole and polyaniline described above have good characteristics, and therefore cells employing these materials have bright prospects for practical use.

Usually, an electrolyte employed in this type of secondary cell is prepared by dissolving alkaline metallic salt such as lithium salt, for instance, lithium perchlorate and lithium tetrafluoroborate, in an organic aprotic solvent such as propylene carbonate. This electrolyte has already been used in nonaqueous cell such as a lithium cell.

However, a secondary cell employing the conductive polymer as an electrode material has a higher electrode potential than an existing nonaqueous cell. Accordingly, when a cell comprising the above conventional electrolyte is charged and discharged the cell voltage becomes excessively high with progress of the charging.

The charge end voltages of lithium secondary cells emoploying $V_2O_5$, polypyrrole and polyaniline as a positive electrode material were examined. The results are shown in the following Table 1. The cells were charged with a current of 1mA for 10 hours and the electrolyte of each cell comprised a solution obtained by dissolving 1M of lithium perchrolate in propylene carbonate.

TABLE 1

| positive electrode | charge end voltage (V) |
| --- | --- |
| $V_2O_5$ | 3.19 |

TABLE 1-continued

| positive electrode | charge end voltage (V) |
| --- | --- |
| $RuO_2$ | 2.72 |
| $WO_3$ | 2.06 |
| $MoO_2$ | 1.75 |
| $Nb_2O_5$ | 1.76 |
| $TiS_2$ | 2.88 |
| $NbS_2$ | 2.97 |
| polypyrrole | 4.30 |
| polyaniline | 4.35 |

The above results show that the cells employing polypyrrole and polyaniline as a positive electrode material have high charge end voltages compared with the cells employing the other materials ($V_2O_5$ and so on).

As a result, the former cells have the problems of lowering charge and discharge efficiency and deteriorating storage characteristics due to the side reaction wherein the electrolyte, dopant and conductive polymer are decomposed. The larger charging capacity the cell has, the more remarkable this tendency is. Therefore, in such a case, deterioration in cycle characteristics is so serious that the cycle life of the cell becomes short.

The following Table 2 shows, by way of reference, the operating voltages of the lithium primary cells employing various positive electrode materials.

TABLE 2

| positive electrode | operating voltage (V) |
| --- | --- |
| $MnO_2$ | 3.0 |
| CF | 2.6 |
| $SO_2$ | 2.8 |
| $Ag_2CrO_4$ | 3.0 |
| CuS | 2.2 |
| $FeS_2$ | 1.6 |

As apparent from the above table, the operating voltages of the lithium primary cells are not so high as to cause the conventional solvents to be decomposed. Accordingly, the above problems do not rise where $MnO_2$ or the like is used as a positive electrode material.

SUMMARY OF THE INVENTION

An object of the present invention, therefore, is to provide a secondary cell capable of improving cycle characteristics remarkably.

Another object of the present invention is to provide a cell capable of improving charge and discharge efficiency.

A further object of the present invention is to provide a secondary cell capable of effectively preventing deterioration of storage characteristics of the cell.

The above objects are fulfilled by a cell according to the present invention comprising; a positive electrode formed of a conductive polymer, a negative electrode, a separator disposed between the positive electrode and negative electrode, and an electrolyte including a mixed solvent of γ-butyrolactone and a cyclic carbonic ester compound expressed by the following chemical formulas.

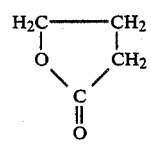 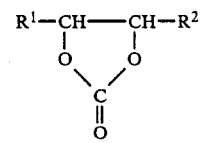

γ-butyrolactone    cyclic carbonic ester compound (where $R^1$ is a lower alkyl group having 1-3 carbon atoms and $R^2$ is a hydrogen atom or a methyl group, $R^2$ being a hydrogen atom, and $R^1$ being a group other than the methyl group.)

The above objects are also fulfilled by a rechargeable secondary cell comprising; a positive electrode formed of a conductive polymer, a negative electrode, and an electrolyte including a mixed solvent of γ-butyrolactone and ethylene carbonate expressed by the following chemical formulas.

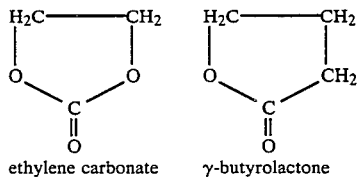

ethylene carbonate    γ-butyrolactone

The cyclic carbonic ester compound is selected from a group consisting of 1,2-butylene carbonate, 2,3-butylene carbonate, 1,2-pentene carbonate and 2,3-pentene carbonate, each being expressed by the following chemical formula.

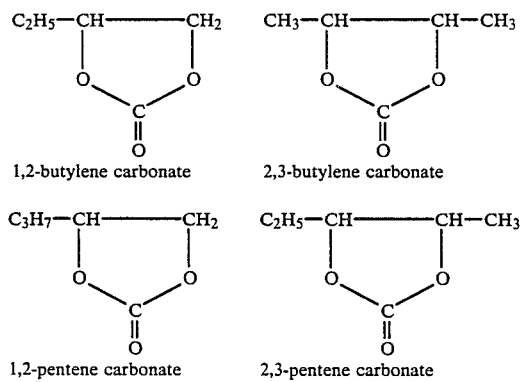

1,2-butylene carbonate    2,3-butylene carbonate 1,2-pentene carbonate    2,3-pentene carbonate The conductive polymer is selected from a group consisting of polypyrrole and polyaniline.

The reason why the foregoing objects are fulfilled by the present invention is as follows.

A mixed solvent of ethylene carbonate and γ-butyrolactone or of a cyclic carbonic ester compound and γ-butyrolactone has a high decomposition voltage compared with propylene carbonate. This repress the decomposition of the above mixed solvent even when the cell pressure rises with progress of the charging, whereby the deterioration of the electrolyte efficiency can be prevented. In addition, the cell is prevented from expanding because gas generation in the cell is suppressed. These advantages of the cell according to the present invention lead to the prevention of the lowering of charge and discharge efficiency and of the deterioration of storage characteristics.

Further, since the charge voltage is lowered to some degree by adding τ-butyrolactone to the electrolyte, a cell can and a collector are prevented from being corroded (for example, solution of iron included in stainless steel forming the collector). This feature suppress the decomposition of the electrolyte, dopant or conductive polymer. Therefore, the cell according to the present invention is capable of improving charge and discharge characteristics and cycle characteristics.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:-

DESCRIPTION OF THE PREFRRED EMVODIMENTS

First Embodiment (Example 1)

Figure 1:
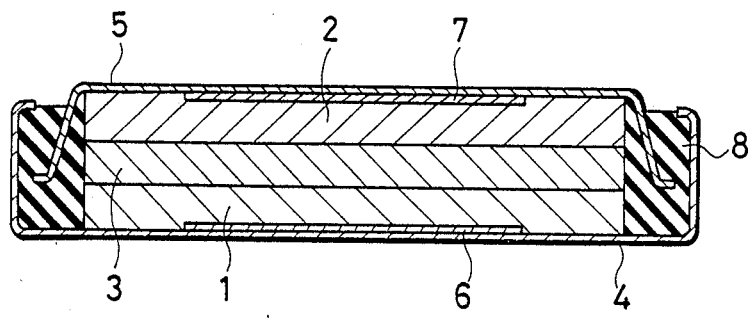
FIG. 1 is a section view of a cell according to the present invention.

A first example embodying the present invention will be described hereinafter referring to a flat type nonaqueous secondary cell shown in FIG. 1.

Number 2 indicates a negative electrode formed of metallic lithium. This negative electrode 2 is pressed upon an internal surface of a negative collector 7 which is secured to the bottom inside surface of a negative can 5 formed of stainless steel and substantially U-shaped in sectional view. The above negative can 5 is fixed at the peripheral end thereof to the inside of an insulating packing 8 formed of polypropylene and a positive can 4 formed of stainless steel and substantially U-shaped in sectional view is fixed peripherally of the insulating packing 8 is the direction opposed to the above negative can 5. A positive collector 6 is secured to the bottom inside surface of the positive can 4 and has a positive electrode 1 fixed to the inside surface thereof. A separator 3 is disposed between the positive electrode 1 and negative electrode 2.

The positive electrode 1 is produced by molding under pressure powder of polypyrrole compounded by electrolytic polymerization, into a circular shape. The negative electrode 2 is produced by punching a piece having a predetermined size out of a rolled lithium plate. The electrolyte comprises a solution prepared by dissolving 1M of lithium perchlorate in an organic solvent. The organic solvent is prepared by mixing ethylene carbonate and γ-butyrolactone in a ratio of 1:1, each being expressed by the following chemical formula.

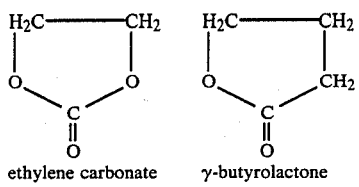

ethylene carbonate    γ-butyrolactone

The cell produced through the above process is referred to as cell A1 hereinafter.

(Comparative Example 1)

A cell was produced in the same way as Example 1 except that the organic solvent comprised propylene carbonate.

The cell thus obtained is referred to as cell X1 hereinafter.

(Experiment I)

Cells A1 and X1 were charged with a current of 1mA for 10 hours and discharged with a current of 1mA until the cell voltages fell to 2.5V. This charge and discharge cycle was carried out repeatedly.

Figure 2:
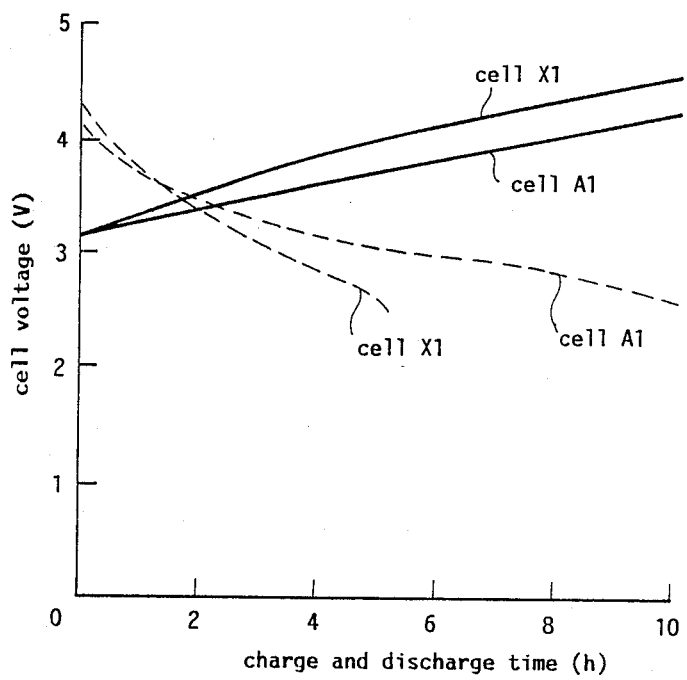
FIG. 2 is a graph showing variations with time of the cell voltages at a 100th charge and discharge cycle of the cell A1 according to the present invention and comparative cell X1.

FIG. 2 shows variations in the cell voltage at a 100th charge and discharge cycle. Further, a relationship between the number of cycles and charge and discharge efficiency was checked on both cells. The results are shown in FIG. 3.

As evident from FIG. 2, comparative cell X1 has a high charge voltage and the charge end voltage was 4.5V after the cell was charged for 10 hours. On the other hand, with cell A1 according to the present invention, the charge voltage rises slowly and the charge end voltage was 4.17V after the 10 hours' charging. In addition, cell X1 has a discharge voltage falling rapidly and the cell voltage after the 5 hours' charging was 2.5V. On the other hand, cell A1 has a discharge voltage which falls slowly and the cell voltage fell to 2.5V only after the cell was discharged for 10 hours.

Figure 3:
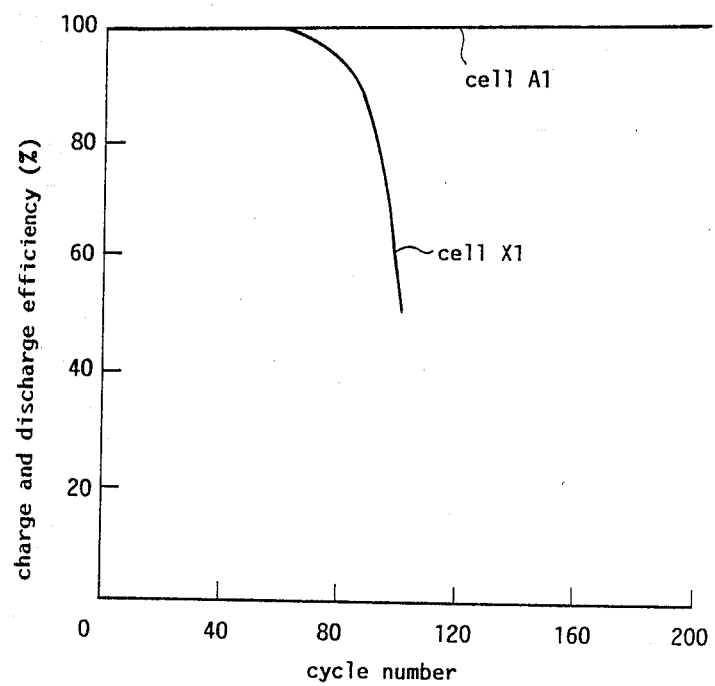
FIG. 3 is a graph showing a relationship between the number of charge and discharge cycles and the charge and discharge efficiency of cells A1 and X1.

It will be seen from FIG. 3 that cell X1 has a charge and discharge efficiency which begins to be lowered around a 60th cycle. The charge and discharge efficiency was lowered to 51% at a 100th cycle and the cycle life came to an end (when the charge and discharge efficiency is lowered to less than 50%) at a 101th cycle. Compared with cell X1, cell A1 maintained the charge and discharge efficiency at 100% even after the 100th cycle.

It will be understood from the above observations that cell A1 according to the present invention has a remarkably improved performance compared with cell X1.

This is considered due to the following reasons.

The mixed solvent of ethylene carbonate and γ-butyrolactone included in the electrolyte of cell A1 has a high decomposition potential compared with propylene carbonate included in the electrolyte of cell X1. This prevents the side reaction in which the electrolyte is decomposed. Further, the charge voltage becomes lower to some degree by adding γ-butyrolactone in the electrolyte, thereby to suppress dissolution of the cell can and decomposition of the electrolyte.

The lowering of the cell voltage mentioned above is due to the following reasons.

The anion [such as ion perchlorate ($ClO_4^-$)] used as a dopant in this type of cell is solvated in the solvent when undoped whereas it is doped into the conductive polymer when there occurs a doping reaction. In this case, it largely depends on the interaction between the solvent in which the anion is solvated and the conductive polymer into which the anion is doped whether the dissolutin of the solvation and doping are effected with ease or not. Where the electrolyte comprises an organic solvent including γ-butyrolactone as in the present invention, the solvation of anion and γ-butyrolactone is easily dissolved due to the interaction between the γ-butyrolactone and conductive polymer. As a result, the cell voltage at the charging time is prevented from rising excessively.

In the above Example 1, only the positive electrode comprises a conductive polymer. However, the same results may of course be obtained where both positive and negative electrodes comprise a conductive polymer.

(Examples II–VII)

Cells were produced in the same way as Example 1 except that organic solvents were prepared by mixing propylene carbonate and γ-butyrolactone in volume ratios of 95:5, 90:10, 70:30, 40:60, 20:80 and 10:90, respectively, as shown in the following Table 3.

These cells are referred to as cells A2–A7 hereinafter.

Comparative Examples II, III)

Cells were produced in the same way as Example 1 except that organic solvents were prepared by mixing propyolene carbonate and γ-butyrolactone in a volume ratio of 50:50 and mixing propylene carbonate and 1,2-dimethoxyethane in a volume ratio of 50:50 respectively.

These cells are referred to as cells X2 and X3 hereinafter.

TABLE 3

| | positive electrode | negative electrode | charge end voltage (V) (after a 100th cycle) | charge and discharge efficiency (%) (after a 100th cycle) | volume ratio of organic solvent ethylene carbonate: γ-butyrolactone |
|---|---|---|---|---|---|
| A1 | polypyrrole | Li | 4.17 | 100 | 50:50 |
| A2 | polypyrrole | " | 4.33 | 95 | 95:5 |
| A3 | polypyrrole | " | 4.20 | 99 | 90:10 |
| A4 | polypyrrole | " | 4.17 | 100 | 70:30 |
| A5 | polypyrrole | " | 4.16 | 100 | 40:60 |
| A6 | polypyrrole | " | 4.20 | 99 | 20:80 |
| A7 | polypyrrole | " | 4.38 | 94 | 10:90 |
| X1 | polypyrrole | " | 4.50 | 51 | propylene carbonate |
| X2 | polypyrrole | " | 4.48 | 68 | ethylene carbonate: γ-butyrolactone 50:50 |
| X3 | polypyrrole | " | 4.52 | 45 | propylene carbonate: 1,2-dimethoxy- |

TABLE 3-continued

| positive electrode | negative electrode | charge end voltage (V) (after a 100th cycle) | charge and discharge efficiency (%) (after a 100th cycle) | volume ratio of organic solvent ethylene carbonate: γ-butyrolactone |
|---|---|---|---|---|
| | | | | ethane 50:50 |

(Experiment II)

Cells A1-A7 accoridng to the present invention and comparative cells X1-X3 were charged with a current of 1mA for 1 0 hours and discharged with a current of 1mA until the cell voltages fell to 2.5V. This charge and discharge cycle was effected repeatedly. The charge end voltage and charge and discharge efficiency of each cell at a 100th cycle are shown in Table 3.

It will be seen from Table 3 that cells X1-X3 have charge end voltages of 4.50V, 4.48V and 4,52V and charge and discharge efficiency of 51%, 68% and 45%, respectively. In comparison, cells A2 and A7 according to the present invention have charge end voltages of 4.33V and 4.38V and charge and discharge efficiency of 95% and 94%, respectively, which show good characteristics. Further, cells A3 and A6 according to the present invention have charge end voltages of 4.20V and 4.20V and charge and discharge efficiency of 99% and 99%, respectively, which indicate that these cell are superior in characteristics to cells A2 and A7. Further, cells A1, A4 and A5 have charge end voltages of 4. 17V, 4.17V and 4.16V and charge and discharge efficiency of 100%, 100% and 100%, respectively. It will be seen from the above description that cells A1, A4 and A5 according to the present invention have most superior characteristics.

As a result, the volume ratio of ethylene carbonate and γ-butyrolactone is preferably within the range of 90:10-20:80, and more preferably within the range of 70:30-40:60.

Second Embodiment (Example I)

A cell was produced in the same way as Example I of the First Embodiment except that the organic solvent was prepared by mixing 1,2-butylene carbonate expressed by the following chemical formula and γ-butyrolactone in a volume ratio of 50:50.

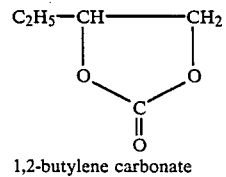

1,2-butylene carbonate

The cell thus obtained is referred to as cell B1 hereinafter.

The cell X1 used in the First Embodiment was also employed as a comparative cell.

(Experiment I)

Figure 4:
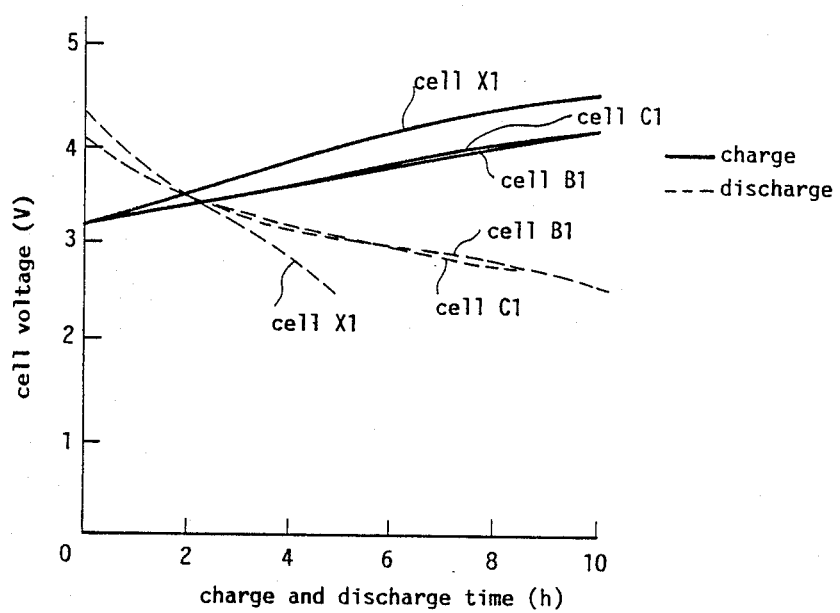
FIG. 4 is a graph showing variations with time of the cell voltages at a 100th charge and discharge cycle of cells B1 and C1 according to the present invention.
Figure 5:
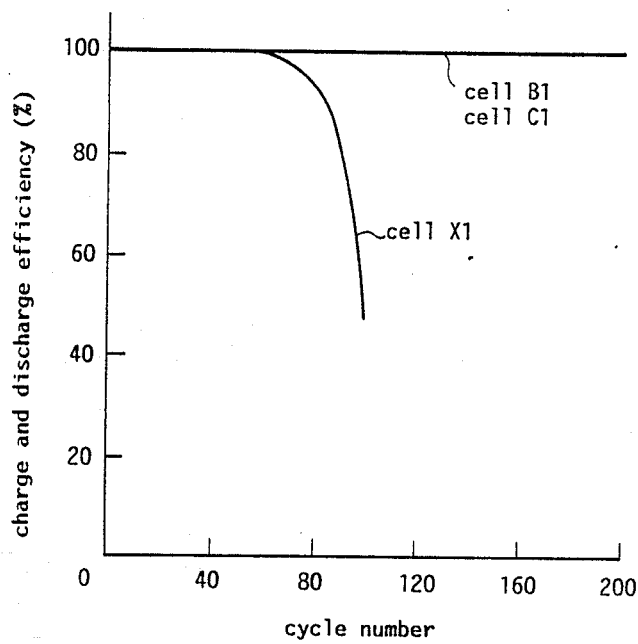
FIG. 5 is a graph showing a relationship between the number of charge and discharge cycles and the charge and discharge efficiency of cells B1, C1 and X1.

Variations in the cell voltage at a 100th charge and discharge cycle and a relation between the number of cycles and charge and discharge efficiency were checked and the result are shown in FIGS. 4 and 5.

It will be seen from FIG. 4 that comparative cell X1 has a charging voltage rising sharply, with a charge end voltage at 4.50V after the 10 hours' charging. On the other hand, with cell B1 according to the present invention, the charge voltage rises slowly and the charge end voltage is 4.15V after the 10 hours' charging. In addition, cell X1 has a charge and discharge efficiency lowered to 51%, while cell B1 maintains the charge and discharge efficiency at 100%.

Further, as seen from FIG. 5, the charge and discharge efficiency of cell X1 begins to be lowered around a 60th cycle and the cycle life comes to an end (when the charge and discharge efficiency is lowered to less than 50%) around a 100th cycle. On the other hand, cell B1 maintains the charge and discharge efficiency at 100% even after a 200th charge and discharge cycle.

It will be understood from the above observations that cell B1 according to the present invention has a remarkably improved performance compared with comparative cell X1.

Where the solvent comprises a cyclic carbonic acid ester compound (for example, 1,2-butylene carbonate) alone, the cell voltage becomes high because of poor conductivity of the compound, thereby causing a side reaction in which materials forming the cell can become dissolved. Therefore, it is preferably that the solvent is prepared by mixing the cyclic carbonic ester compound and γ-butyrolactone.

(Examples II-VII)

Cells were produced in the same way as the First Embodiment except that organic solvents were prepared by mixing 1,2-butylene carbonate and γ-butyrolactone in volume ratios of 95:5, 90:10, 70:30, 40:60, 20:80 and 10:90, respectively, as shown in the following Table 4.

These cells are referred to as cells B2-B7 hereinafter.

Cells X1-X3 used in the First Embodiment were also employed as comparative cells.

TABLE 4

| | positive electrode | negative electrode | charge end voltage (V) (after a 100th cycle) | charge and discharge efficiency (%) (after a 100th cycle) | volume ratio of organic solvent 1,2-butylene carbonate: γ-butyrolactone |
|---|---|---|---|---|---|
| B1 | poly-pyrrole | Li | 4.15 | 100 | 50:50 |
| B2 | poly-pyrrole | " | 4.30 | 97 | 95:5 |
| B3 | poly-pyrrole | " | 4.18 | 99 | 90:10 |
| B4 | poly-pyrrole | " | 4.16 | 100 | 70:30 |
| B5 | poly-pyrrole | " | 4.15 | 100 | 40:60 |
| B6 | poly-pyrrole | " | 4.19 | 99 | 20:80 |
| B7 | poly-pyrrole | " | 4.35 | 95 | 10:90 |

(Experiment II)

Charge end voltages and charge and discahrge efficiency of the cells were checked under the same conditions as Experiment II of the First Embodiment. The results are shown in the Table 4.

It will be seen that cells B2 and B7 have charge end voltages of 4.30V and 4.35V and charge and discharge efficiency of 97% and 95%, respectively, and thus have good characteristics. Further, cells B3 and B6 according to the present invention have charge end voltages of 4.18V and 4. 19V and charge and discharge efficiency of 99% and 99%, respectively, which indicate that these cells are superior in characteristics to cells B2 and B7. Further, cells B1, B4 and B5 according to the present invention have charge end voltages of 4.15V, 4.16V and 4.15V and charge and discharge efficiency of 100%, 100% and 100%, respectively. It will be seen from the above description that cells B1, B4 and B5 according to the present invention have most superior characteristics.

As a result, the volume ratio of 1,2-butylene carbonate and γ-butyrolactone is preferably within the range of 90:10–20:80, and more preferably within the range of 70:30–40:60.

Third Embodiment (Example I)

A cell was produced in the same way as Example I of the First Embodiment except that the organic solvent was prepared by mixing 1,2-pentene carbonate expressed by the following chemical formula and γ-butyrolactone in a volume ratio of 50:50.

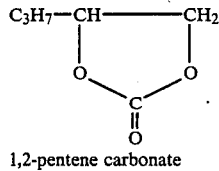

1,2-pentene carbonate

The cell thus obtained is referred to as cell C1 hereinafter.

The cell X1 used in the First Embodiment was also employed as a comparative cell.

(Experiment I)

Variations in the cell voltage at a 100th charge and discharge cycle and a relation between the number of cycles and charge and discharge efficiency were checked and the results are shown in FIGS. 4 and 5.

It will be seen from FIG. 4 that the charge voltage of cell C1 according to the present invention rises slowly and the charge end voltage is 4.15V after the cell is charged for 10 hours and that the charge and discharge efficiency of cell C1 remains at 100%.

Further, as evident from FIG. 5, the charge and discharge efficiency of cell C1 remains at 100% even after a 200th charge and discharge cycle.

It will be understood from the above observations that cell C1 according to the present invention has a remarkably improved performance compared with comparative cell X1.

(Examples II–VII)

Cells were produced in the same way as Example I except that organic solvents were prepared by mixing 1,2-pentene carbonate and γ-butyrolactone in volume ratios of 95:5, 90:10, 70:30, 40:60, 20:80 and 10:90, respectively, as shown in the following Table 5.

These cells are referred to as cells C2–C7 hereinafter.

Cells X1–X3 used in the First Embodiment were also employed as comparative cells.

TABLE 5

| positive electrode | negative electrode | charge end voltage (V) (after a 100th cycle) | charge and discharge efficiency (%) (after a 100th cycle) | volume ratio of organic solvent 1,2-pentene carbonate: γ-butyrolactone |
|---|---|---|---|---|
| C1 poly-pyrrole | Li | 4.15 | 100 | 50:50 |
| C2 poly-pyrrole | " | 4.31 | 96 | 95:5 |
| C3 poly-pyrrole | " | 4.17 | 99 | 90:10 |
| C4 poly-pyrrole | " | 4.16 | 100 | 70:30 |
| C5 poly-pyrrole | " | 4.15 | 100 | 40:60 |
| C6 poly-pyrrole | " | 4.18 | 99 | 20:80 |
| C7 poly-pyrrole | " | 4.35 | 95 | 10:90 |

(Experiment II)

The charge end voltages and charge and discharge efficiency of the cells were checked under the same conditions as the Experiment II of the First Embodiment. The results are shown in Table 5.

It will be seen that cells C2 and C7 have charge end voltages of 4.31V and 4.35V and charge and discharge efficiency of 96% and 95%, respectively, and thus have good characteristics. Further, cells C3 and C6 according to the present invention have charge end voltages of 4.17V and 4. 18V and charge and discharge efficiency of 99% and 99%, respectively, which indicates that these cells are superior in characteristics to cells C2 and C7. Further, cells C1, C4 and C5 according to the present invention have charge end voltages of 4.15V, 4.16V and 4.15V and charge and discharge efficiency of 100%, 100% and 100%, respectively. It will be seen from the above description that cells C1, C4 and C5 according to the present invention have most superior characteristics.

As a result, the volume ratio of 1,2-pentene carbonate and γ-butyrolactone is preferably within the range of 90:10–20:80, and more preferably within the range of 70:30–40:60.

Fourth Embodiment (Example I–VII)

Cells were produced in the same way as the First Embodiment except that the organic solvent was prepared by mixing 2,3-butylene carbonate expressed by the following chemical formula and γ-butyrolactone in volume ratios of 50:50, 95:5, 90:10, 70:30, 40:60, 20:80 and 10:90, respectively.

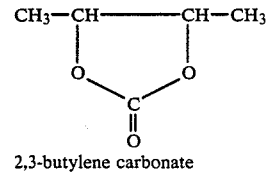

2,3-butylene carbonate

The cells thus obtained are referred to as cells D1–D7 hereinafter.

The cells X1–X3 used in the First Embodiment were also employed as comparative cells.

TABLE 6

| | positive electrode | negative electrode | charge end voltage (V) (after a 100th cycle) | charge and discharge efficiency (%) (after a 100th cycle) | volume ratio of organic solvent 2,3-butylene carbonate: γ-butyrolactone |
|---|---|---|---|---|---|
| D1 | polypyrrole | Li | 4.16 | 100 | 50:50 |
| D2 | polypyrrole | " | 4.30 | 96 | 95:5 |
| D3 | polypyrrole | " | 4.18 | 99 | 90:10 |
| D4 | polypyrrole | " | 4.17 | 100 | 70:30 |
| D5 | polypyrrole | " | 4.16 | 100 | 40:60 |
| D6 | polypyrrole | " | 4.18 | 99 | 20:80 |
| D7 | polypyrrole | " | 4.37 | 96 | 10:90 |

(Experiment I)

Variations in the cell voltage at a 100th charge and discharge cycle and a relation between the number of cycles and charge and discharge efficiency were checked and the results are shown in Table 6.

It will be seen from Table 6 that cells D2 and D7 according to the present invention have charge end voltages of 4.30V and 4.37V and charge and discharge efficiency of 96% and 96%, respectively, and thus show good characteristics. Further, cells D3 and D6 according to the present invention have charge end voltages of 4.18V and 4.18V and charge and discharge efficiency of 99% and 99%, respectively, which indicate that these cell are supeior in characteristics to cells D2 and D7. Further, cells D1, D4 and D5 have charge end voltages of 4.16V, 4.17V and 4.16V and charge and discharge efficiency of 100%, 100% and 100%, respectively. It will be seen from the above description that cells D1, D4 and D5 according to the present invention have remarkably improved characteristics compared with comparative cells X1-X3.

As a result, the volume ration of 2,3-butylene carbonate and γ-butyrolactone is preferably within the range of 90:10-20:80, and more preferably within the range of 70:30-40:60.

Fifth Embodiment (Example I)

A cell was produced in the same way as Example I of the First Embodiment except that a positive electrode was obtained by molding under pressure powder of polyaniline into a circular shape. The above powder of polyaniline had been prepared by eletrolytic polymerization.

The cell thus obtained is referred to as cell E1 hereinafter.

(Comparative Example)

A cell was produced in the same way as Example I except that the organic solvent comprised propylene carbonate.

The cell thus obtained is referred to as cell Y1 hereinafter.

(Experiment II)

Cycle test was conducted on the cells E1 and Y1 under the same conditions as Experiment I of the First Embodiment. Variations in the cell voltage at a 100th charge and discharge cycle and a relation between the number of cycles and charge and discharge efficiency were checked.

Figure 6:
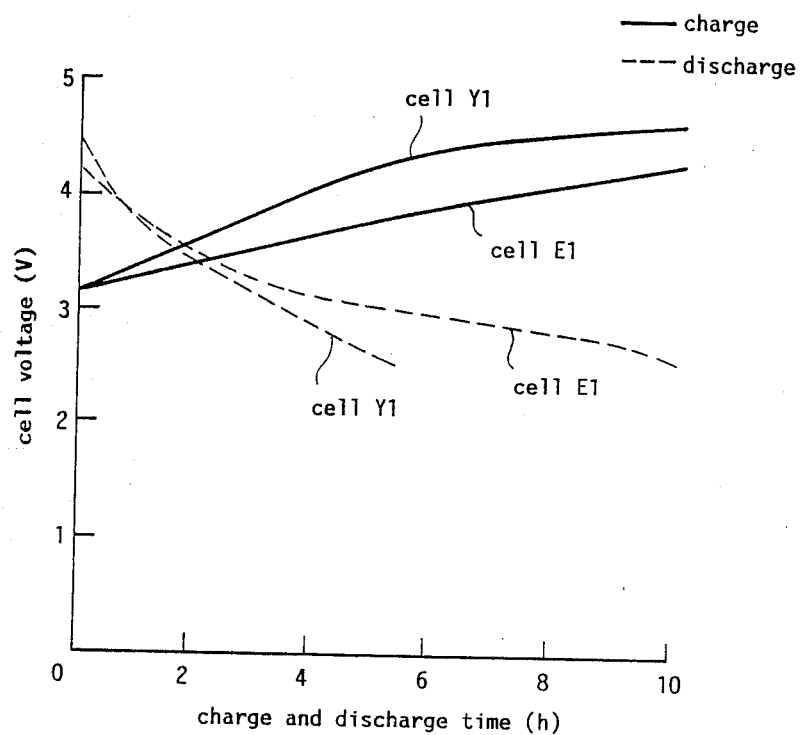
FIG. 6 is a graph showing variations with time in the cell voltages at a 100th charge and discharge cycle of cell E1 according to the present invention and comparative cell Y1.
Figure 7:
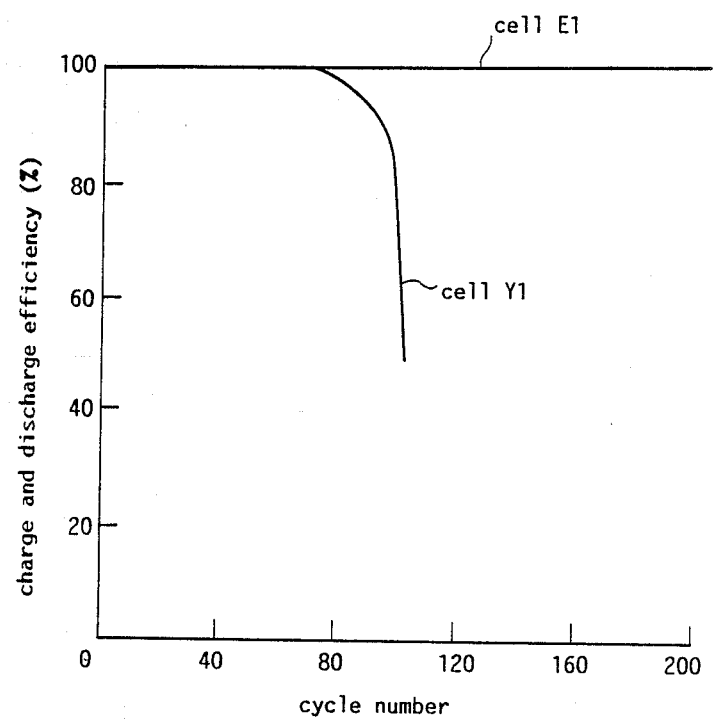
FIG. 7 is a graph showing a relationship between the number of charge and discharge cycles and the charge and discharge efficiency of cells E1 and Y1.

The results are shown in FIGS. 6 and 7.

As evident from FIG. 6, comparative cell Y1 has a charge voltage rising sharply, with a charge end voltage at 4.58V after the 10 hours' charging. On the other hand, cell E1 according to the present invention has a charge voltage rising slowly, with a charge end voltage at 4.23V. In addition, cell Y1 has a discharge voltage which falls rapidly and the cell voltage after the 5.5 hours' discharging was 2.5V. On the other hand, cell E1 has a discharge voltage falling slowly and the cell voltage fell to 2.5V only after the cell was discharged for 10 hours.

It will be seen from FIG. 7 that cell Y1 has a charge and discharge efficiency which begins to be lowered around a 70th cycle. The charge and discharge efficiency was lowered to 60% at a 100th cycle and the cycle life came to an end (when the charge and discharge efficiency is lowered to less than 50%) at a 102th cycle. Compared with cell Y1, cell E1 maintained the charge and discharge efficiency at 100% even after the 100th cycle.

It will be understood from the above observations that cell E1 according to the present invention has a remarkably improved performance compared with cell Y1.

(Examples II-VII)

Cells were produced in the same way as Example 1 except that organic solvents were prepared by mixing propylene carbonate and γ-butyrolactone in a volume ratio of 50:50, and mixing propylene carbonate and 1,2-dimethoxyethane in a volume ration of 50:50, respectively, as shown in the following Table 7.

These cells are referred to as cells Y2 and Y3 hereinafter.

TABLE 7

| | positive electrode | negative electrode | charge end voltage (V) (after a 100th cycle) | charge and discharge efficiency (%) (after a 100th cycle) | volume ratio of organic solvent ethylene carbonate: γ-butyrolactone |
|---|---|---|---|---|---|
| E1 | polyaniline | Li | 4.23 | 100 | 50:50 |
| E2 | polyaniline | " | 4.45 | 95 | 95:5 |
| E3 | polyaniline | " | 4.28 | 99 | 90:10 |
| E4 | polyaniline | " | 4.25 | 100 | 70:30 |
| E5 | polyaniline | " | 4.25 | 100 | 40:60 |
| E6 | polyaniline | " | 4.29 | 99 | 20:80 |
| E7 | polyaniline | " | 4.46 | 93 | 10:90 |
| Y1 | polyaniline | " | 4.58 | 60 | propylene carbonate |
| Y2 | polyaniline | " | 4.55 | 75 | propylene carbonate: γ-butyrolactone 50:50 |
| Y3 | polyaniline | " | 4.63 | 52 | propylene carbonate: 1,2-dimethoxyethane 50:50 |

(Experiment II)

The charge end voltages and charge and discharge efficiency of cells E1–E7 according to the present invention and comparative cells Y1–Y3 were checked under the same conditions as Experiment II of the First Embodiment. The results are shown in Table 7.

It will be seen from Table 7 that comparative cells Y1–Y3 have charge end voltages of 4.58V, 4.55V and 4.63V and charge and discharge efficiency of 60%, 75% and 52%, respectively. In comparison, cells E2 and E7 according to the present invention have charge end voltages of 4.45V and 4.46V and charge and discharge efficiency of 95% and 93%, respectively, which show good characteristics. Further, cells E3 and E6 according to the present invention have charge end voltages of 4.28V and 4.29V and charge and discharge efficiency of 99% and 99%, respectively, which indicate that these cell are superior in characteristics to cells E2 and E7. Further, cells E1, E4 and E5 have charge end voltages of 4.23V, 4.25V and 4.25V and charge and discharge efficiency of 100%, 100% and 100%, respectively. It will be seen from the above description that cells E1, E4 and E5 according to the present invention have most superior characteristics.

As a result, even when polyaniline is employed as a positive electrode, the volume ratio of ethylene carbonate and γ-butyrolactone is preferably within the range of 90:10–20:80, and more preferably within the range of 70:30–40:60.

Sixth Embodiment (Example I)

A cell was produced in the same way as Example I of the Fifth Embodiment except that the organic solvent was prepared by mixing 1,2-butylene carbonate and γ-butyrolactone in a volume ration of 50:50.

The cell thus obtained is referred to as cell F1 hereinafter.

The cell Y1 used in the Fifth Embodiment was also employed as a comparative cell.

(Experiment I)

Figure 8:
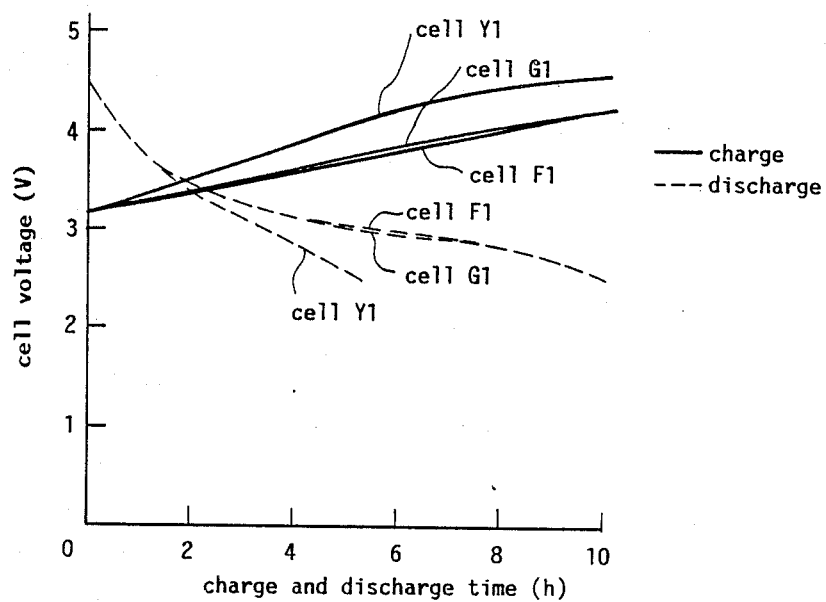
FIG. 8 is a graph showing variations with time in the cell voltages at a 100th charge and discharge cycle of cells F1 and G1 according to the present invention and comprative cell Y1.
Figure 9:
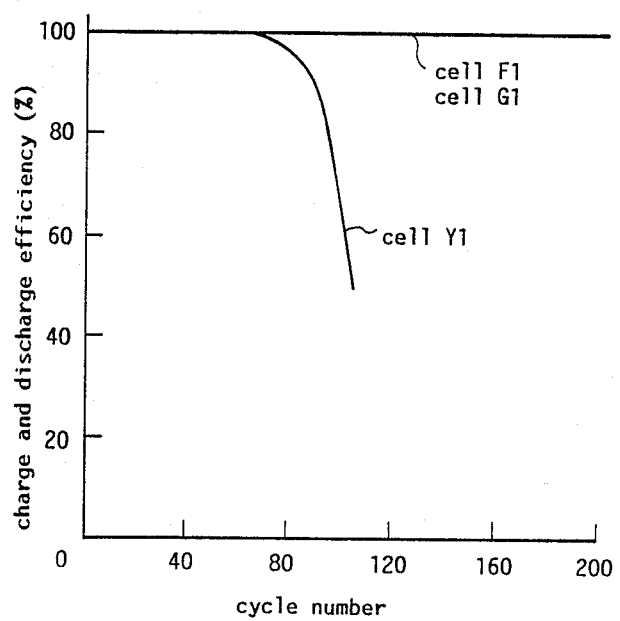
FIG. 9 is a graph showing a relationship between the number of charge and discharge cycles and the charge and discharge efficiency of cells F1, G1 and Y1.

Variations in the cell voltage at a 100th charge and discharge cycle and a relation between the number of cycles and charge and discharge efficiency were checked and the result are shown in FIGS. 8 and 9.

It will be seen from FIG. 8 that comparative cell Y1 has a charge voltage rising sharply, with a charge end voltage at 4.58V after the 10 hours' charging. On the other hand, with cell F1 according to the present invention, the charge voltage rises slowly and the charge end voltage is 4.25V after the 10 hours' charging. In addition, cell Y1 has a charge and discharge efficiency lowered to 60%, while cell F1 maintains the charge and discharge efficiency at 100%.

Further, as seen from FIG. 9, the charge and discharge efficiency of cell Y1 begins to be lowered around a 70th cycle and the cycle life comes to an end (when the charge and discharge efficiency is lowered to less than 50%) around a 102th cycle. On the other hand, cell F1 maintains the charge and discharge efficiency at 100% even after a 200th charge and discharge cycle.

It will be understood from the above observations that cell F1 according to the present invention has a remarkably improved performance compared with comparative cell Y1.

(Examples II–VII)

Cells were produced in the same way as the First Embodiment except that organic solvents were prepared by mixing 1,2-butylene carbonate and γ-butyrolactone in volume ratios of 95:5, 90:10, 70:30, 40:60, 20:80 and 10:90, respectively, as shown in the following Table 8.

These cells are referred to as cells F2–F7 hereinafter.

Cells Y1–Y3 used in the Fifth Embodiment were also employed as comparative cells.

TABLE 8

| | positive electrode | negative electrode | charge end voltage (V) (after a 100th cycle) | charge and discharge efficiency (%) (after a 100th cycle) | volume ratio of organic solvent 1,2-butylene carbonate : γ-butyrolactone |
|---|---|---|---|---|---|
| F1 | poly-aniline | Li | 4.25 | 100 | 50:50 |
| F2 | poly-aniline | " | 4.35 | 97 | 95:5 |
| F3 | poly-aniline | " | 4.28 | 99 | 90:10 |
| F4 | poly-aniline | " | 4.26 | 100 | 70:30 |
| F5 | poly-aniline | " | 4.25 | 100 | 40:60 |
| F6 | poly-aniline | " | 4.28 | 99 | 20:80 |
| F7 | poly-aniline | " | 4.45 | 96 | 10:90 |

(Experiment II)

Charge end voltages and charge and discahrge efficiency of the cells were checked under the same conditions as Experiment II of the First Embodiment. The results are shown in the Table 8.

It will be seen that cells F2 and F7 have charge end voltages of 4.35V and 4.45V and charge and discharge efficiency of 97% and 96%, respectively, and thus have good characteristics. Further, cells F3 and F6 according to the present invention have charge end voltages of 4.28V and 4. 28V and charge and discharge efficiency of 99% and 99%, respectively, which indicate that these cells are superior in characteristics to cells F2 and F7. Further, cells F1, F4 and F5 according to the present invention have charge end voltages of 4.25V, 4.26V and 4.25V and charge and discharge efficiency of 100%, 100% and 100%, respectively. It will be seen from the above description that cells F1, F4 and F5 according to the present invention have most superior characteristics.

As a result, the volume ratio of 1,2-butylene carbonate and γ-butyrolactone is preferably within the range of 90:10–20:80, and more preferably within the range of 70:30–40:60.

Seventh Embodiment (Example I)

A cell was produced in the same way as Example I of the Fifth Embodiment except that the organic solvent was prepared by mixing 1,2-pentene carbonate and γ-butyrolactone in a volume ratio of 50:50.

The cell thus obtained is referred to as cell G1 hereinafter.

The cell Y1 used in the Fifth Embodiment was also employed as a comparative cell.

(Experiment I)

Variations in the cell voltage at a 100th charge and discharge cycle and a relation between the number of cycles and charge and discharge efficiency were checked and the results are shown in FIGS. 8 and 9.

It will be seen from FIG. 8 that the charge voltage of cell G1 according to the present invention rises slowly and the charge end voltage is 4.25V after the cell is charged for 10 hours and that the charge and discharge efficiency of cell G1 remains at 100%.

Further, as evident from FIG. 9, the charge and discharge efficiency of cell G1 remains at 100% even after a 200th charge and discharge cycle.

It will be understood from the above observations that cell G1 according to the present invention has a remarkably improved performance compared with comparative cell Y1.

(Examples II-VII)

Cells were produced in the same way as Example I except that organic solvents were prepared by mixing 1,2-pentene carbonate and γ-butyrolactone in volume ratios of 95:5, 90:10, 70:30, 40:60, 20:80 and 10:90, respectively, as shown in the following Table 9.

These cells are referred to as cells G2-G7 hereinafter.

Cells Y1-Y3 used in the Fifth Embodiment were also employed as comparative cells.

TABLE 9

| | positive electrode | negative electrode | charge end voltage (V) (after a 100th cycle) | charge and discharge efficiency (%) (after a 100th cycle) | volume ratio of organic solvent 1,2-pentene carbonate: γ-butyrolactone |
|---|---|---|---|---|---|
| G1 | poly-aniline | Li | 4.25 | 100 | 50:50 |
| G2 | poly-aniline | " | 4.42 | 97 | 95:5 |
| G3 | poly-aniline | " | 4.28 | 99 | 90:10 |
| G4 | poly-aniline | " | 4.26 | 100 | 70:30 |
| G5 | poly-aniline | " | 4.26 | 100 | 40:60 |
| G6 | poly-aniline | " | 4.29 | 99 | 20:80 |
| G7 | poly-aniline | " | 4.45 | 95 | 10:90 |

(Experiment II)

The charge end voltages and charge and discharge efficiency of the cells were checked under the same conditions as Experiment II of the First Embodiment. The results are shown in Table 9.

It will be seen that cells G2 and G7 have charge end voltages of 4.42V and 4.45V and charge and discharge efficiency of 97% and 95%, respectively, and thus have good characteristics. Further, cells G3 and G6 according to the present invention have charge end voltages of 4.28V and 4.29V and charge and discharge efficiency of 99% and 99%, respectively, which indicate that these cells are superior in characteristics to cells G2 and G7. Further, cells G1, G4 and G5 according to the present invention have charge end voltages of 4.25V, 4.26V and 4.26V and charge and discharge efficiency of 100%, 100% and 100%, respectively. It will be seen from the above description that cells G1, G4 and G5 according to the present invention have most superior characteristics.

As a result, the volume ratio of 1,2-pentene carbonate and γ-butyrolactone is preferably within the range of 90:10-20:80, and more preferably within the range of 70:30-40:60.

Eighth Embodiment (Example I-VII)

Cells were produced in the same way as the Example I of Fifth Embodiment except that organic solvents were prepared by mixing 2,3-butylene carbonate and γ-butyrolactone in volume ratios of 50:50, 95:5, 90:10, 70:30, 40:60, 20:80 and 10:90, respectively.

The cells thus obtained are referred to as cells H1-H7 hereinafter.

The cells Y1-Y3 used in the Fifth Embodiment were also employed as comparative cells.

TABLE 10

| | positive electrode | negative electrode | charge end voltage (V) (after a 100th cycle) | charge and discharge efficiency (%) (after a 100th cycle) | volume ratio of organic solvent 2,3 butylene carbonate γ-butyrolactone |
|---|---|---|---|---|---|
| H1 | poly-aniline | Li | 4.25 | 100 | 50:50 |
| H2 | poly-aniline | " | 4.38 | 96 | 95:5 |
| H3 | poly-aniline | " | 4.28 | 99 | 90:10 |
| H4 | poly-aniline | " | 4.26 | 100 | 70:30 |
| H5 | poly-aniline | " | 4.26 | 100 | 40:60 |
| H6 | poly-aniline | " | 4.29 | 99 | 20:80 |
| H7 | poly-aniline | " | 4.45 | 96 | 10:90 |

(Experiment I)

Variations in the cell voltage at a 100th charge and discharge cycle and a relation between the number of cycles and charge and discharge efficiency were checked and the results are shown in Table 10.

It will be seen from Table 10 that cells H2 and H7 according to the present invention have charge end voltages of 4.38V and 4.45V and charge and discharge efficiency of 96% and 96%, respectively, and thus show good characteristics. Further, cells H3 and H6 according to the present invention have charge end voltages of 4.28V and 4.29V and charge and discharge efficiency of 99% and 99%, respectively, which indicate that these cells are supeior in characteristics to cells H2 and H7. Further, cells H1, H4 and H5 have charge end voltages of 4.25V, 4.26V and 4.26V and charge and discharge efficiency of 100%, 100% and 100%, respectively. It will be seen from the above description that cells H1, H4 and H5 according to the present invention have remarkably improved characteristics compared with comparative cells Y1-Y3.

As a result, the volume ratio of 2,3-butylene carbonate and γ-butyrolactone is preferably within the range of 90:10-20:80, and more preferably within the range of 70:30-40:60. In addition, the cyclic carbonic ester compound is not limited to the above 1,2-butylene carbonate and so on, and the same effects can be obtained by employing 2,3-pentene carbonate expressed by the following chemical formula.

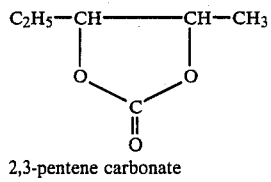

2,3-pentene carbonate

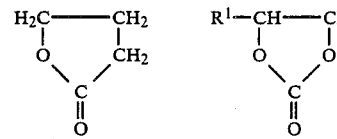

γ-butyrolactone   cyclic carbonic ester compound (Another Experiment)

Decomposition currets were checked with various solvents. The results are shown in the following Table 11.

This test was conducted under a potential of 4.20V (VS. Li/Li +).

TABLE 11

| | | solvent | 4.20 V decomposition current (μA) |
|---|---|---|---|
| present invention | Z1 | 1,2-butylene carbonate + γ − BL 50:50 | 2.8–3.0 |
| | Z2 | 2,3-butylene carbonate + γ − BL 50:50 | 2.7–3.1 |
| | Z3 | 1,2-pentene carbonate − γ − BL 50:50 | 2.8–3.1 |
| | Z4 | 2,3-pentene carbonate + γ − BL 50:50 | 2.6–2.9 |
| | Z5 | ethylene carbonate + γ − BL 50:50 | 2.7–3.2 |
| comparative examples | Z6 | propylene carbonate | 4.5–5.5 |
| | Z7 | propylene carbonate + γ − BL | 4.8–5.7 |
| | Z8 | γ − BL | 5.0–6.0 |

It will be seen from Table 11 that mixed solvents Z1–Z5 according to the present invenion have decomposition currents of 2.6–3.2 μA, while the comparative solvents Z6–Z8 have decomposition currents of 4.5–6.0 μA. Therefore, it is considered that the mixed solvents according to the present invention are effective to reduce the amount of the solvent which becomes decomposed at the charging and discharging times.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A rechargeable secondary cell comprising;
   a positive electrode formed of a conductive polymer;
   a negative electrode;
   a separator disposed between the positive electrode and the negative electrode; and
   an electrolyte including a mixed solvent of γ-butyrolactone and a cyclic carbonic ester compound expressed by the following chemical formulas.

(where $R^1$ is a lower alkyl group having 1–3 carbon atoms and $R^2$ is a hydrogen atom or a methyl group, $R^2$ being a hydrogen atom, and $R^1$ being a group other than the methyl group.)

2. A cell as claimed in claim 1, wherein the compound of cyclic carbonic ester compound is selected from a group consisting of 1,2-butylene carbonate, 2,3-butylene carbonate, 1,2-pentene carbonate and 2,3-pentene carbonate, each being expressed by the following chemical formula.

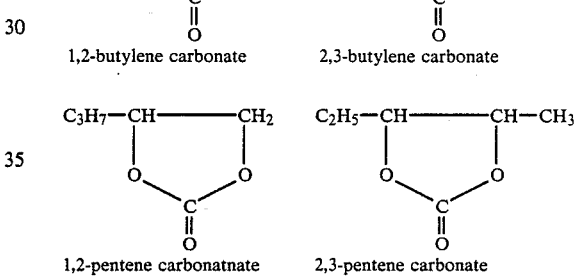

1,2-butylene carbonate   2,3-butylene carbonate 1,2-pentene carbonatnate   2,3-pentene carbonate 3. A cell as claimed in claim 1, wherein the conductive polymer is selected from a group consisting of polypyrrole and polyaniline.

4. A cell as claimed in claim 1, wherein the electrolyte comprises a mixed solution prepared by dissolving lithium perchlorate into a mixed solvent of γ-butyrolactone and a cyclic carbonic ester compound.

5. A cell as claimed in claim 1, wherein the cyclic carbonic ester compound and γ-butyrolactone are mixed in a volume ratio of 90:10–20:80.

6. A cell as claimed in claim 1, wherein the cyclic carbonic ester compound and γ-butyrolactone are mixed in a volume raio of 70:30–40:60.

7. A cell as claimed in claim 1, wherein the negative electrode comprises a conductive polymer.

8. A cell as claimed in claim 1, wherein the negative electrode comprises a metallic lithium.

9. A rechargeable secondary cell comprising:
   a positive electrode formed of a conductive polymer;
   a negative electrode; and
   an electrolyte including a mixed solvent of γ-butyrolactone and ethylene carbonate expressed by the following chemical formulas.

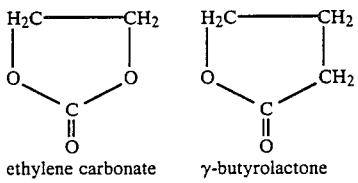

ethylene carbonate    γ-butyrolactone

10. A cell as claim in claim 9, wherein the conductive polymer is selected from a group consisting of polypyrrole and polyaniline.

11. A cell as claim in claim 9, wherein the electrolyte comprises a mixed solution prepared by dissolving lithium perchlorate into a mixed solvent of γ-butyrolactone and ethylene carbonate.

12. A cell as claimed in claim 9, wherein the γ-butyrolactone and ethylene carbonate are mixed in a volume ratio of 90:10–20:80.

13. A cell as claimed in claim 9, wherein the γ-butyrolactone and ethylene carbonate are mixed in a volume ratio of 70:30–40:60.

14. A cell as claimed in claim 9, wherein the negative electrode is pressed upon a bottom inside surface of a negative collector.

15. A cell as claimed in claim 9, wherein the positive electrode is pressed upon a bottom inside surface of a positive collector.

* * * * *